United States Patent [19]

Story

[11] 3,783,834

[45] Jan. 8, 1974

[54] QUAIL HARNESS

[76] Inventor: Jake T. Story, 2206 N.W. 17th, Oklahoma City, Okla. 73107

[22] Filed: Jan. 12, 1972

[21] Appl. No.: 217,338

[52] U.S. Cl. ................................................ 119/96
[51] Int. Cl. .......................................... A62b 35/00
[58] Field of Search ............................... 109/96, 29

[56] References Cited
UNITED STATES PATENTS

| | | | |
|---|---|---|---|
| 2,449,741 | 9/1948 | Fitzpatrick | 119/96 X |
| 1,816,262 | 7/1931 | Ritter | 119/96 |
| 2,434,968 | 1/1948 | Smith | 119/96 |
| 2,677,488 | 5/1954 | Prusan | 119/96 |
| 2,132,556 | 10/1938 | Blackshaw | 119/96 |
| 2,212,746 | 8/1940 | Nunn | 119/96 |

Primary Examiner—Louis G. Mancene
Assistant Examiner—J. N. Eskovitz
Attorney—Harvey B. Jacobson

[57] ABSTRACT

A harness for birds, particularly quail, having a first single, longitudinally extending strap forming breast and back strap portions and provided with an opening forming a collar for enclosing the neck of a bird to be harnessed. A second single, longitudinally extending strap removably connected to the first strap for encircling the body of the bird beneath the wings thereof. The second strap is provided with a buckle for selectively connecting end portions thereof to one another. An eye is connected to an end portion of the first strap adjacent the second strap for selectively connecting a line thereto for controlling the movement of the bird.

1 Claim, 2 Drawing Figures

PATENTED JAN 8 1974

3,783,834

QUAIL HARNESS

BACKGROUND OF THE INVENTION

1. Field of the Invention

This invention relates to a harness for birds. In particular, this invention relates to a quail harness for use in training bird dogs by controlling the movement of a quail.

2. Description of the Prior Art

It is desired in the course of training bird dogs to use actual game birds. If the bird can be held captive by a line, it can be used over and over again in training dogs and save much trouble and expense.

It is known to harness birds to prevent them from flying away. Such harness, examples of which may be found in U. S. Pat. Nos. 2,703,553 and 2,778,335, are generally intended for small pet birds such as parakeets and canaries. These known harnesses are generally constructed as a single flexible element which is wrapped around the bird. They are not intended, however, for larger birds such as quail who are to be permitted to fly as far as the line will permit them and then be stopped thereby. The line must of course be long enough to permit the game bird to fly a great distance and obtain great momentum.

SUMMARY OF THE INVENTION

It is an object of the present invention to provide a harness for game birds such as quail which is suitable for use in training bird dogs.

This and other objects are accomplished according to the present invention by providing a harness for birds having first strap means forming breast and back strap portions and provided with an opening for forming a collar for encircling the neck of the bird to be harnessed, and second strap means connected to the first strap means for encircling the body of the bird beneath the wings thereof.

The first strap means preferably is a single, longitudinally extending piece with spaced end portions each connected to the second strap means for movement with respect thereto. The first strap means also has an enlarged portion arranged between the breast and back strap portions. The enlarged portion has walls defining the collar opening.

The second strap means preferably is a single, longitudinally extending strap with spaced end portions. Means are provided for selectively connecting the end portions of the strap to one another.

Means are advantageously connected to one of the end portions of the first strap means and arranged adjacent the second strap means for selectively connecting a line thereto. This means may be an eye.

The first and second strap means are preferably constructed from a thin, flexible material.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
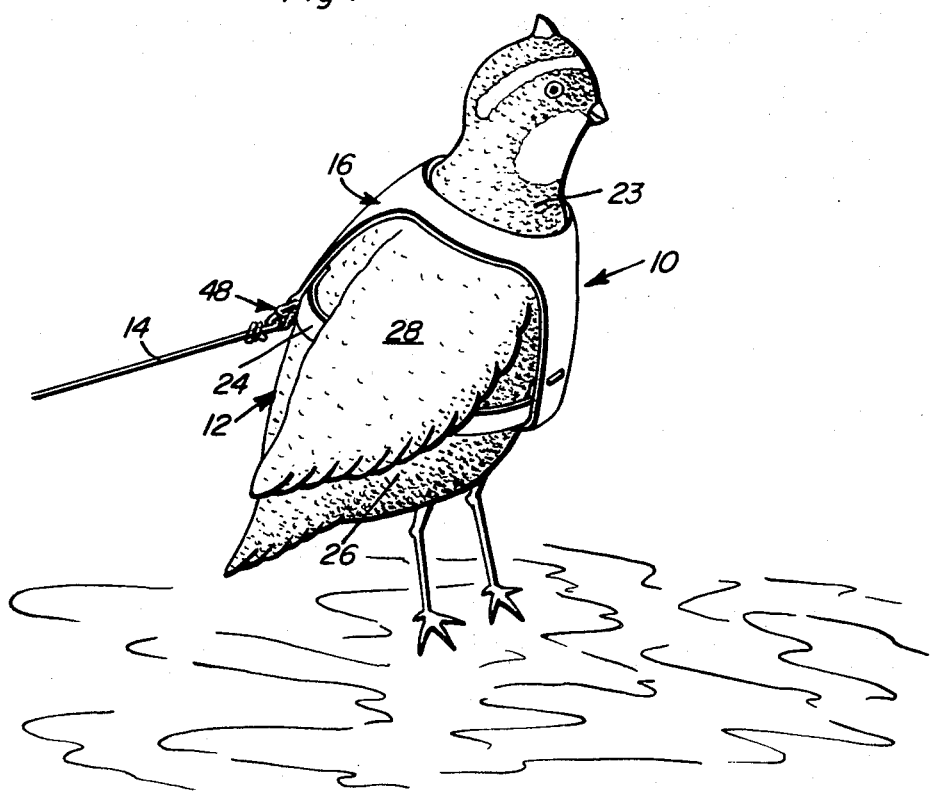
FIG. 1 is a perspective view showing a harness according to the present invention arranged on a quail.

FIG. 1 of the drawings shows a harness 10 according to the present invention arranged on a quail 12, and having a line 14 connected thereto for holding quail 12 captive.

Figure 2:
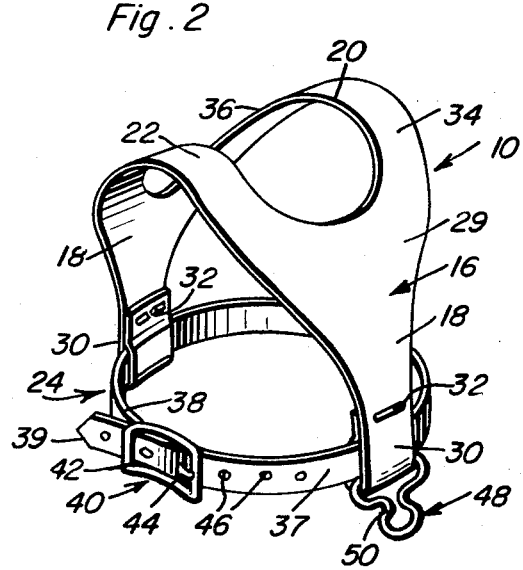
FIG. 2 is a perspective view showing a harness according to the present invention.

As can best be seen from FIG. 2, harness 10 has first strap means 16 for forming breast and back strap portions 18. First strap means 16 is provided with an opening 20 for forming a collar 22 for encircling the neck 23 (FIG. 1) of quail 12.

A second strap means 24 is connected to first strap means 16 and is arranged for encircling the body 26 of quail 12 beneath wings 28 thereof.

First strap means 16 is constructed from a thin, flexible material as a single, longitudinally extending strap piece 29 with spaced end portions 30. End portions 30 are connected to second strap means 24 for movement with respect thereto as by bending each end portion 30 around second strap means 24 and securing same as by staples 32. An enlarged portion 34 is arranged between breast and back strap portions 18 enlarged portion 34 has walls 36 defining opening 20.

Second strap means 24 is also constructed from a thin, flexible material as a single, longitudinally extending strap 37 with spaced end portions 38, 39. A means 40 is provided for selectively connecting end portions 38, 39 to one another. This means 40 has a buckle 42 constructed in the usual manner, and having a tongue 44 which engages in holes 46 provided in strap 37.

A means 48, which may be an eye 50 of known construction, is connected to one of end portions 30 adjacent second strap means 24 for selectively connecting line 14 to harness 10.

The thin, flexible material from which the straps of harness 10 are constructed may be any suitable, known material. Preferably, a suitable synthetic material is used.

Harness 10 may be put on a, for example, quail 12 by unbuckling 42 and fitting opening 20 over the head and neck of the bird. The strap piece 37 may be arranged under the wings 28 of the bird and buckles 42 fastened. Now the tethered quail 12 may be permitted to fly a limited distance, and the dogs being trained are exposed to quail 12 under simulated field conditions. In this manner, the dogs may be trained quickly and efficiently with little trouble and expense to their trainer.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A harness for birds, comprising, in combination:
   a. first strap means for forming breast and back strap portions and a collar, and including a single, planar, longitudinally extending strap piece having spaced, unitary end portions forming the breast and back strap portions, the strap piece provided with an enlarged portion arranged between the breast and back strap portions and having walls defining an opening arranged for forming a collar for encircling the neck of a bird to be harnessed;

b. second strap means connected to the end portions of the strap piece for encircling the body of the bird beneath the wings thereof, and including a single, longitudinally extending strap with spaced end portions, and means for selectively connecting the end portions to one another, the strap piece end portions arranged around the strap and forming a loop for permitting movement of the strap piece along the longitudinal extent of the strap; and c. means connected to the loop of one of said end portions of the first strap means adjacent said second strap means for selectively connecting a line thereto.

* * * * *